United States Patent
Yu et al.

(10) Patent No.: US 12,021,812 B2
(45) Date of Patent: Jun. 25, 2024

(54) FACILITATING TIME ZONE PREDICTION BASED ON ELECTRONIC COMMUNICATION DATA

(71) Applicant: ADOBE INC., San Jose, CA (US)

(72) Inventors: Lijun Yu, Sunnyvale, CA (US); Wuyang Dai, Santa Clara, CA (US); Jun He, Fremont, CA (US); Hsiang-Yu Yang, Palo Alto, CA (US); Zhenyu Yan, Cupertino, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/509,885

(22) Filed: Oct. 25, 2021

(65) Prior Publication Data
US 2023/0129808 A1 Apr. 27, 2023

(51) Int. Cl.
| | | |
|---|---|---|
| *G06F 15/16* | (2006.01) | |
| *G06F 18/10* | (2023.01) | |
| *G06F 18/21* | (2023.01) | |
| *G06F 18/214* | (2023.01) | |
| *G06F 18/2413* | (2023.01) | |
| *G06N 20/00* | (2019.01) | |
| *H04L 51/222* | (2022.01) | |

(52) U.S. Cl.
CPC ............ *H04L 51/222* (2022.05); *G06F 18/10* (2023.01); *G06F 18/214* (2023.01); *G06F 18/217* (2023.01); *G06F 18/24147* (2023.01); *G06N 20/00* (2019.01)

(58) Field of Classification Search
None
See application file for complete search history.

(56) References Cited

U.S. PATENT DOCUMENTS

| | | | |
|---|---|---|---|
| 9,134,427 B2 | 9/2015 | McIntosh | |
| 9,602,574 B1* | 3/2017 | Mocanu | H04L 67/02 |
| 10,848,445 B1* | 11/2020 | Willmann | H04L 51/046 |
| 2003/0115258 A1* | 6/2003 | Baumeister | H04L 9/40 |
| | | | 719/311 |
| 2011/0164472 A1* | 7/2011 | Arena | G04G 9/0076 |
| | | | 368/21 |
| 2019/0361896 A1* | 11/2019 | Brunets | H04M 15/66 |
| 2019/0362248 A1* | 11/2019 | Rogynskyy | G06F 16/289 |
| 2019/0362249 A1* | 11/2019 | Rogynskyy | G06F 16/24575 |

OTHER PUBLICATIONS

Agresti, A. (2003). Categorical data analysis (vol. 482). John Wiley & Sons.

* cited by examiner

*Primary Examiner* — Phuoc H Nguyen
(74) *Attorney, Agent, or Firm* — Shook, Hardy & Bacon L.L.P.

(57) ABSTRACT

Methods and systems are provided for facilitating time zone prediction using electronic communication data. Electronic message data associated with a message recipient of electronic communications is obtained. The electronic message data includes message delivery data associated with an electronic message and message response data associated with a response, by the message recipient, to a received electronic message. Using a machine learning model and based on the message delivery data and the message response data, a time-zone score is determined for a time zone. Such a time-zone score can indicate a probability the time zone corresponds with the message recipient. Based on the time-zone score, the time zone is identified as corresponding with the message recipient.

20 Claims, 8 Drawing Sheets

FACILITATING TIME ZONE PREDICTION BASED ON ELECTRONIC COMMUNICATION DATA

BACKGROUND

Knowledge of time zones in which computer users are located can provide valuable information. With knowledge of time zones, appropriate decisions can be made as to when to provide users with information. For example, based on a time zone associated with a computer user, an optimal time at which to send an electronic communication to the user can be determined. Conventional technologies used to identify a time zone generally include geographic positioning techniques. In many cases, however, such a conventional implementation can be difficult and resource intensive to perform. For example, computational resources to build a pipeline to consume, store, and process additional geographical data can be extensive.

SUMMARY

Embodiments of the present technology are directed towards facilitating estimation of time zones for individuals using electronic communication data. In this regard, time zones for recipients of electronic communications can be predicted or estimated based on data associated with previous electronic communications. In this way, in cases in which a time zone is not known for an individual, a time zone can be predicted by leveraging electronic message delivery information and responses associated therewith and, advantageously, without any resource requirement for hardware or sensor related data.

In operation, a time-zone estimation model can be trained and, thereafter, used to estimate or predict time zones. To train a time-zone estimation model, electronic communication data, such as message delivery data and message response data, associated with message recipients having known time zones can be used. The time-zone estimation model may be in the form of an ensemble model or a hierarchical model that includes a set of models trained to, in combination, predict time zones. Such an ensemble or hierarchical model may include a collaborative-based model that is based on collaborative population information and an independent-based model that is based on individual recipient information. The collaborative-based model is trained based on an assumption that a batch of messages having a high distribution density on one known time zone may indicate localization of the recipients. To train the collaborative-based model, message delivery data and profile data for message recipients with known time zones can be used as an input to generate a time-zone score(s) indicating a probability or likelihood of a time zone(s) for a message recipient.

The individual-based model is trained based on message recipient's activities to estimate time zones. To train the individual-based model, message delivery data, message response data, and profile data for message recipients with known time zones can be used as an input to generate a time-zone score(s) indicating a probability or likelihood of a time zone(s) for a message recipient. The time-zone scores generated from the collaborative-based model and the individual-based model can be normalized and used as an input into a prediction model to predict a final time-zone score(s) indicating a probability or likelihood of a time zone(s) for the message recipient. A loss function(s) can be applied to the models to train the models, as described in more detail herein.

Upon training the time-zone estimation model (e.g., including the collaboration-based model, the individual-based model, and the prediction model), the trained time-zone estimation model can be used to predict time zones for individuals with unknown time zones. To this end, electronic communication data associated with an individual can be used as an input into the time-zone estimation model, and specifically the trained collaboration-based model and trained individual-based model, to identify a time-zone score(s) indicating a probability of a time zone(s) for the individual. Such time-zone scores can be normalized and used as an input into the trained prediction model to generate a set of final time-zone scores for the individual. Accordingly, a predicted time zone for the individual can be identified.

DETAILED DESCRIPTION

Figure 1:
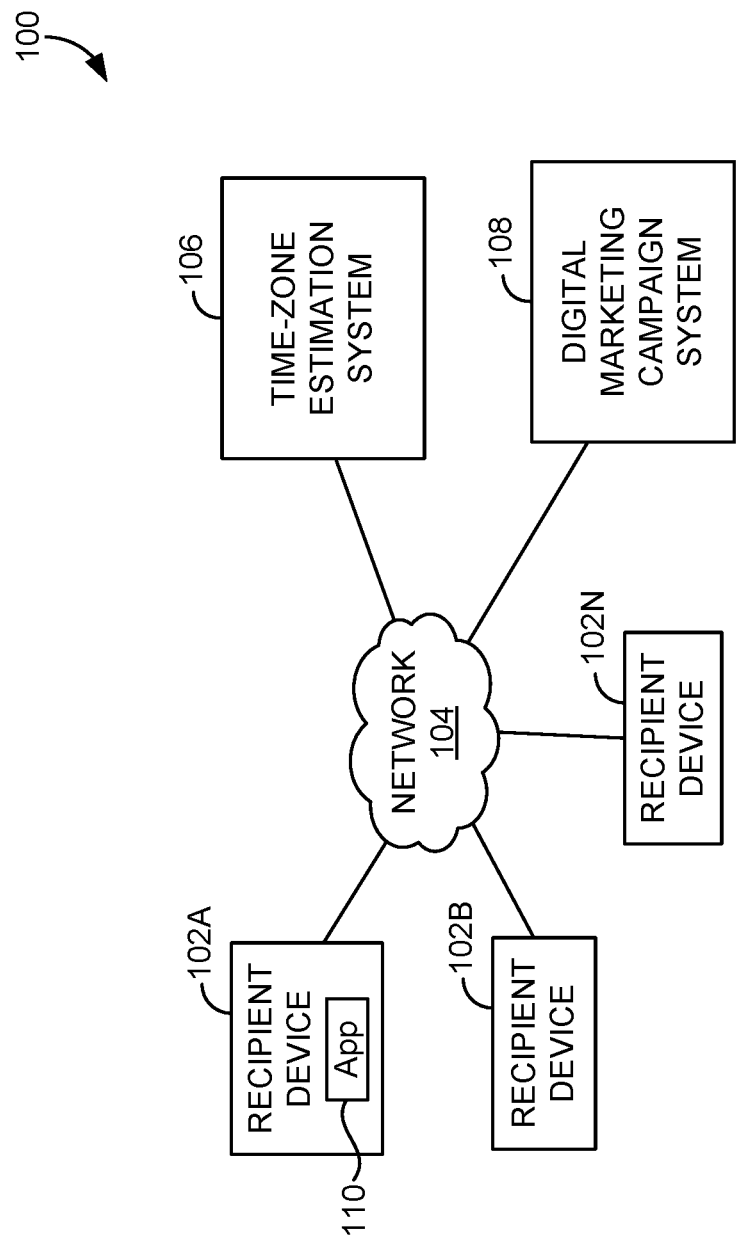
FIG. 1 depicts a diagram of an environment in which one or more embodiments of the present disclosure can be practiced, in accordance with various embodiments of the present disclosure.

Oftentimes, identification of time zones associated with computer users is desired. With knowledge of time zones, appropriate decisions can be made as to when to provide users with information. By way of example only, a digital marketing campaign system can facilitate marketers to incentivize individuals' engagement via various electronic communications, such as emails, push notifications, SMS, etc. As various companies that use such a digital marketing campaign system have a global business, it is advantageous for the digital marketing campaign system to schedule and execute electronic message deliveries to worldwide recipients in an optimal manner. To optimize delivery times for electronic message deliveries, it is often desirable that the recipients have electronic messages delivered during based on their actions at a local time (e.g., during awake time periods or during active user time periods). Accordingly, to schedule and execute electronic message delivery in an optimal manner, it is valuable for the digital marketing campaign system to have knowledge of electronic communication recipients' time zones. For example, having a time zone for an electronic communication recipient can enable appropriate reversal of logs of recipients' actions from system time to local time and, as such, be able to deliver messages in an optimal manner. Time zones for each individual electronic message recipient, however, may not be available. For example, in some cases, the time zone for each recipient may not be available due to various issues during data collection, storage, and/or performance of other processes.

Conventional technologies used to identify a user's time zone generally include means of geographic positioning techniques, for example, through hardware sensor embedded in users' portable devices (such as cellphone, GPS, IPs) with users' permission. After obtaining the geographic location for a particular user, the geographic information can be converted to the corresponding time zone based on mathematical time zone rules and geopolitics. In many cases, such a conventional implementation is difficult and resource intensive to perform. For example, assume a digital marketing campaign system is a third-party message schedule system that consumes recipient data (e.g., profiles and records) from a client company. In cases in which no determined time zone can be converted from existing recipient profile data (e.g., using recipient country or city) or appropriate data is not provided by the recipient, the data can be difficult to obtain. For example, an incomplete infrastructure may lead to a failure in data collection. As another example, the digital marketing campaign system interface may need updated and various rounds of tests may need to be conducted to obtain such data accurately. Further, utilization of electronic communication clients operating on recipient computers might block any tracking of recipient data (e.g., IP address, etc.).

Accordingly, embodiments of the present technology are directed to estimating time zones for individuals using electronic communication data. In this regard, time zones for recipients of electronic communications can be predicted or estimated based on data associated with previous electronic communications. In this way, in cases in which a time zone is not known for an individual, a time zone can be predicted by leveraging electronic message delivery information and responses associated therewith and, advantageously, without any resource requirement for hardware or sensor related data.

In operation, a time-zone estimation system can be used to train a time-zone estimation model that can be used to estimate or predict time zones. To train a time-zone estimation model, electronic communication data, such as message delivery data and message response data, associated with message recipients having known time zones can be used. As described herein, the time-zone estimation model may be in the form of an ensemble model or a hierarchical model that includes a set of models trained to, in combination, predict time zones. Such an ensemble or hierarchical model may include one model that is based on collaborative population information (generally referred herein to as a collaborative-based model) and another model that is based on individual recipient information (generally referred to herein as an individual-based model). The collaborative-based model is trained based on an assumption that a batch of messages having a high distribution density on one known time zone may indicate localization of the recipients. To train the collaborative-based model, message delivery data and profile data for message recipients with known time zones can be used as an input to generate a time-zone score(s) indicating a probability or likelihood of a time zone(s) for a message recipient.

The individual-based model is trained based on message recipient's activities to estimate time zones. To train the individual-based model, message delivery data, message response data, and profile data for message recipients with known time zones can be used as an input to generate a time-zone score(s) indicating a probability or likelihood of a time zone(s) for a message recipient. The time-zone scores generated from the collaborative-based model and the individual-based model can be normalized and used as an input into a prediction model to predict a final time-zone score(s) indicating a probability or likelihood of a time zone(s) for the message recipient. A loss function(s) can be applied to the models to train the models, as described in more detail herein.

Upon training the time-zone estimation model (e.g., including the collaboration-based model, the individual-based model, and the prediction model), the trained time-zone estimation model can be used to predict time zones for individuals with unknown time zones. To this end, electronic communication data associated with an individual can be used as an input into the time-zone estimation model, and specifically the trained collaboration-based model and trained individual-based model, to identify a time-zone score(s) indicating a probability of a time zone(s) for the individual. Such time-zone scores can be normalized and input into the trained prediction model to generate a set of final time-zone scores for the individual. Accordingly, a predicted time zone for the individual can be identified. As can be appreciated, the framework provided herein enables more features other than message deliveries, message responses, and recipient profiles to enrich the feature space and build more complicated models. For example, other profile attributes, such as country and language, can be incorporated to narrow down an individual's likelihood of being located in a specific time zone.

The predicted time zone can be used in any number of ways. For example, the predicted time zone can be included in the individual's profile for subsequent use by an electronic message campaign system to utilize to schedule and/or deliver electronic messages. In addition to facilitating personalized electronic message delivery time optimization, time zone prediction can help to understand individual's activity pattern, enrich profiles, and provide insight and guidance for future time-sensitive activities.

Advantageously, utilizing time-zone estimation implementations described herein, time zones can be estimated independent of sensor data and geographic data obtained from recipients. That is, as opposed to using hardware sensors embedded in a user device to identify a geographic information and, thereafter, converting the information to a time zone using various rules and geopolitics, time zone estimation can be performed based on electronic messages. As such, computational resources to build a pipeline to consume geographic information from sensor data, store such data, and process the geographic information are not needed to identify time zones for individuals, thereby conserving computation resources. Although time-zone estimation is generally described herein in relation to an electronic message campaign system (e.g., for use in predicting or identifying message delivery schedules), such time-zone estimation can be used as a stand-alone system to predict time zones or incorporated into other systems for utilization of the predicted time zones.

Turning to FIG. 1, FIG. 1 is a diagram of an environment 100 in which one or more embodiments of the present disclosure can be practiced. This and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 8.

Operating environment 100 shown in FIG. 1 is an example of one suitable operating environment. Among other components not shown, operating environment 100 includes a number of recipient devices, such as recipient devices 102a and 102b through 102n, network 104, time-zone estimation system 106, and a digital marketing campaign system 108. Each of the components shown in FIG. 1 may be implemented via any type of computing device, such as one or more of computing device 800 described in connection to FIG. 8, for example. These components may communicate with each other via network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

Any number of recipient devices, servers, and other components may be employed within operating environment 100 within the scope of the present disclosure. Each may comprise a single device or multiple devices cooperating in a distributed environment.

Recipient devices 102a through 102n can be any type of computing device capable of being operated by a recipient of an electronic message(s). A recipient includes an entity that receives electronic messages, such as emails, delivered, for example, from a digital marketing campaign system. A recipient may be a person or a virtual simulator. In some implementations, recipient devices 102a through 102n are the type of computing device described in relation to FIG. 8. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The recipient devices can include one or more processors, and one or more computer-readable media. The computer-readable media may include computer-readable instructions executable by the one or more processors. The instructions may be embodied by one or more applications, such as application 110 shown in FIG. 1. Application 110 is referred to as a single application for simplicity, but its functionality can be embodied by one or more applications in practice. As indicated above, the other user devices can include one or more applications similar to application 110.

The application(s) may generally be any application capable of facilitating the exchange of information between the user devices and the time-zone estimation system 106 and/or the digital marketing campaign system 108 in carrying out time zone prediction. In some implementations, the application(s) comprises a web application, which can run in a web browser, and could be hosted at least partially on the server-side of environment 100. In addition, or instead, the application(s) can comprise a dedicated application, such as an application having supported by the time-zone estimation system 106 and/or the digital marketing campaign system 108 (e.g., an electronic communication application). In some cases, the application is integrated into the operating system (e.g., as a service). It is therefore contemplated herein that "application" be interpreted broadly.

In accordance with embodiments herein, the application 110 can facilitate time zone estimation. For example, recipient devices can receive electronic communications from a digital marketing campaign system 108. Based on the delivery of electronic communications to recipients associated with known time zones, the message delivery data and/or message response data can be used by the time-zone estimation system 106 to train a time-zone estimation model, which can include a set of hierarchical models. For example, assume recipient devices 102A and 102B are operated via recipients associated with known time zones. Data can be captured in association with electronic messages communicated to such recipients and used to train a time-zone estimation model.

Based on the trained time-zone estimation model, a time zone can be estimated for a recipient associated with an unknown time zone. For example, assume recipient device 102N is operated by a recipient not associated with a known time zone. In such a case, data captured in association with electronic messages communicated to recipient device 102N can be used as an input into the trained time-zone estimation model trained via time—zone estimation system 106 to identify a predicted time zone. Such a predicted time zone can be provided to the recipient device (e.g., recipient device 102) for display to the recipient (e.g., for confirmation or acceptance of the time zone). Alternatively or additionally, the predicted time zone can be communicated to another component that uses the estimated time zone, such as digital marketing campaign system 108.

As described herein, the time-zone estimation system 106 facilitate prediction of time zones for individuals. Time-zone estimation system 106 includes one or more processors, and one or more computer-readable media. The computer-readable media includes computer-readable instructions executable by the one or more processors. The instructions may optionally implement one or more components of time-zone estimation system 106, described in additional detail below.

Time-zone estimation system 106 can train and operate a time-zone estimation model in order to predict time zones. Such a time-zone estimation model can be comprised of one or more models trained to generate designated output. For example, a time-zone estimation model can include a collaboration-based model that generates time-zone scores based on collaborative information (e.g., electronic messages sent or delivered as a batch to a group of recipients)

and an individual-based model that generates time-zone scores based on individual information (e.g., recipient responses to received electronic messages). The time-zone scores can be normalized and used as input to a prediction model to predict a final set of time-zone scores. Such a hierarchical implementation can be used to both train the time-zone estimation model and utilize the time-zone estimation model to predict time zones otherwise unknown for recipients.

For cloud-based implementations, the instructions on time-zone estimation system 106 may implement one or more components of time-zone estimation system 106, and application 110 may be utilized by a recipient to interface with the functionality implemented on time-zone estimation system 106 and/or email campaign system 108. In some cases, the components, or portion thereof, of time-zone estimation system 106 may be implemented on a recipient device, the digital marketing campaign system, or other system or device. Thus, it should be appreciated that time-zone estimation system 106 may be provided via multiple devices arranged in a distributed environment that collectively provide the functionality described herein. Additionally, other components not shown may also be included within the distributed environment.

The digital marketing campaign system 108 is generally configured to deliver electronic messages (e.g., emails or other marketing messages) to recipients, or devices associated therewith. In embodiments, the digital marketing campaign system 108 provides electronic messages to recipients associated with known time zones. Data can be collected in association therewith (e.g., via the digital marketing campaign system 108) and provided to or accessible by the time-zone estimation system 106. For example, message delivery data and message response data can be collected via digital marketing campaign system 108 and stored for access by the time-zone estimation system 106.

As described herein, upon the training of a time-zone estimation model, the digital marketing campaign system 108 may utilize time-zone predictions generated by the trained time-zone estimation model to identify time zones associated with recipients having unknown time zones. Such time zones can be used (e.g., via a machine learning model) to generate a message delivery schedule for delivering electronic messages at an optimal time. As described, a digital marketing campaign system, such as digital marketing campaign system 108, is only one example of a system that may use time zone predictions for individuals.

Figure 2:
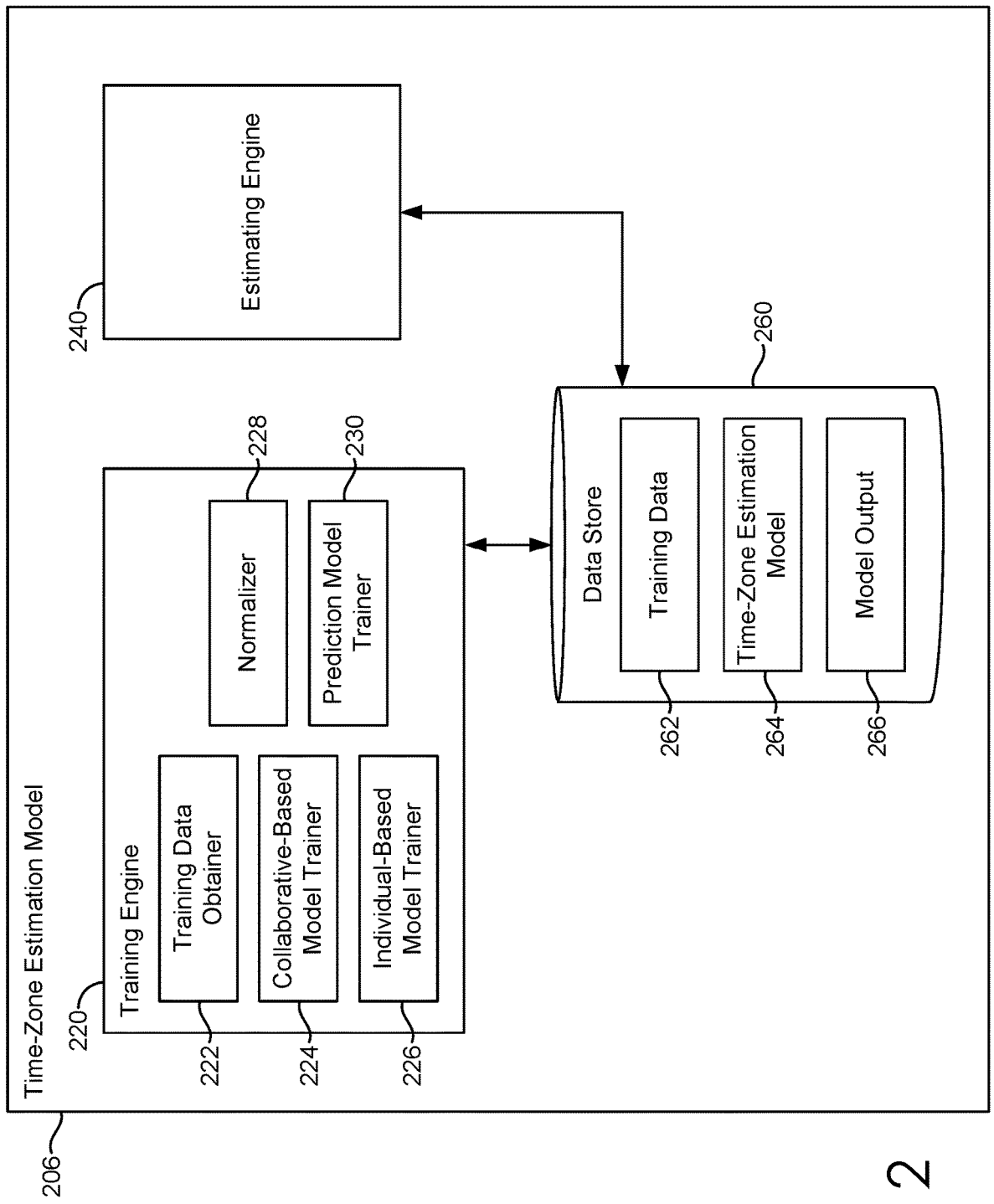
FIG. 2 depicts an illustrative time-zone estimation system, in accordance with various embodiments of the present disclosure.

Referring to FIG. 2, aspects of an illustrative time-zone estimation system are shown, in accordance with various embodiments of the present disclosure. Time-zone estimation system 206 includes training engine 220, estimating engine 240, and data store 260. The foregoing components of time-zone estimation system 206 can be implemented, for example, in operating environment 100 of FIG. 1.

Data store 260 can store computer instructions (e.g., software program instructions, routines, or services), data, and/or models used in embodiments described herein. In some implementations, data store 260 stores information or data received via the various components of training engine 220 and/or estimating engine 240 and provides the various components with access to that information or data, as needed. Although depicted as a single component, data store 260 may be embodied as one or more data stores. Further, the information in data store 260 may be distributed in any suitable manner across one or more data stores for storage (which may be hosted externally).

In embodiments, data stored in data store 260 includes training data 262. Training data generally refers to data used to train a time-zone estimation model, or portion thereof. As such, training data 262 can include recipient profile data and electronic message data, such as message delivery data and message response data. In some cases, time-zone estimation system 206 can receive data from recipient devices (e.g., received from recipient device via, for example, application 110 of FIG. 1). Additionally or alternatively, time-zone estimation system 206 can receive data from a digital marketing campaign system, such as digital marketing campaign system 108. In yet other cases, data can be received from one or more data stores in the cloud. Such received data may be stored in the data store 260.

Data store 260 can also be used to store time-zone estimation model 264. Such a time-zone estimation model can be comprised of one or more models, which can also be stored in data store 260. Data store 260 may also store model output 266, which may include any output, such as time-zone scores and corresponding time zones. Any other data computed by or used by time-zone estimation model 264, and/or aspects associated therewith, may be stored in data store 260 or any other data store accessible to the time-zone estimation system 206.

Training engine 220 is generally configured to train models, such as a time-zone estimation model, including models associated therewith. Such a time-zone estimation model can be used to predict or estimate time zones associated with users. As previously described, in embodiments, a time-zone estimation model generally utilizes electronic message data to predict or estimate a time-zone for an individual. Accordingly, the training engine 220 utilizes electronic message data along with known recipient time zones to train a time-zone estimation model for subsequent use in predicting unknown recipient time zones. As described herein, a recipient may be an individual that receives or is to receive an electronic message. Accordingly, a recipient may be a candidate recipient in that the recipient has not yet received an electronic message, for example, from a digital marketing campaign system.

In one embodiment, as described herein, the time-zone estimation model may be a hierarchy or ensemble of models that, together, predict time zones for recipients. As such, the training engine 220 can train a time-zone estimation model in a hierarchical approach. As described herein, the training engine 220 may initially train a collaborative-based model and an individual-based model. Outputs (e.g., time-zone scores and corresponding time zones) associated with the collaborative-based model and the individual-based model can then be used to train a prediction model. Although generally described herein in a hierarchical structure, embodiments are not limited hereto. For example, in some implementations, a single collaborative-based model or an individual0based model can be implemented to predict time zones for recipients.

As depicted in FIG. 2, training engine 220 includes a training data obtainer 222, collaborative-based model trainer 224, an individual-based model trainer 226, a normalizer 228, and a prediction model trainer 230. Although such components are illustrated separately, as can be appreciated, the functionality described in association therewith can be performed by any number of components.

The training data obtainer 222 is generally configured to obtain training data. Training data generally refers to any type of data used to train a time-zone estimation model, or models associated therewith (e.g., collaborative-based model, individual-based model, and/or a prediction model).

As described herein, training data may include, by way of example, recipient profile data and electronic message data. Recipient profile data refers to any data associated with a recipient of an electronic message(s). A recipient profile, or record of data, may be stored, for example, in a data store (e.g., data store 260) and include information associated with the recipient. For instance, a recipient profile may include a recipient identifier (i.e., a unique recipient identifier, such as an email address), a country, a city, a gender, an age, a language, and a time-zone. A recipient profile may be represented by a unique identifier, such as a profile identifier, which may be the same as the recipient identifier (e.g., an email address).

Electronic message data may include any type of data associated with an electronic message (e.g., an email). Electronic message data may include, among other things, message data, message delivery data, and/or message response data. Message data generally refers to data associated with a sent or delivered electronic message associated with a recipient. Such an electronic message may be included in a batch delivery to a group of recipients and received by a recipient. Message data may include a message identifier that identifies the electronic message. Message data may also include a message delivery time (i.e., a time at which a message is delivered), a recipient identifier, a delivery identifier, and the like.

Message delivery data generally refers to data associated with an electronic message delivered to a recipient(s). As described herein, message delivery data may include data associated with an electronic message delivered in a batch to a group of recipients. Message delivery data may include a delivery identifier that uniquely identifies the electronic message delivery. Message delivery data may also include a message delivery time specifying a date and/or time at which a message is delivered.

Message response data generally refers to any data associated with a response to a delivered electronic message. Such message response data may capture data associated with a recipient's action to open an electronic message, click or select an electronic message, opt out of receiving an electronic message, and/or the like. Message response data may include, by way of example only, a recipient identifier, a delivery identifier, a response type, a response time, etc.

Electronic message data may be stored or captured in a data store, such as data store 260. Electronic message data may be stored as message data logs (e.g., having various records or entries). Each type of message data may be contained within a particular log or record. For example, a message data log may include records of message data, a message delivery data log may include records of message delivery data, and a message response data log may include records of message response data. By way of example only, a message response data log may include a set of records associated with various responses. In some cases, a record corresponds to only one response. In this regard, in cases that a recipient has more than one response associated with an electronic message (e.g., both open and click), two records are created in association with the message. As can be appreciated, any number of logs or records can be used to collect such data.

As can be appreciated, dates and/or times associated with message delivery, message responses, etc. can be captured in any number of ways. As one example, dates and/or times may be captured as a system time, that is the time captured by a system or server.

The training data obtainer 222 may obtain such data in any number of ways. As one example, such training data may be obtained via a data store, such as data store 260, and/or a digital marketing campaign system, such as digital marketing campaign system 108 of FIG. 1. Such data may be obtained in accordance with training a time-zone estimation model, and/or portions thereof. By way of example only, assume a user of a digital marketing campaign system desires to update or identify time zones associated with recipients prior to sending a batch of electronic messages. In such a case, the user may select to update or identify time zones and, based on such a selection, the training data obtainer 222 may obtain training data. In other cases, such data may be obtained automatically (e.g., in association with implementing a time-zone estimation system, in accordance with expiration of a time duration or on a periodic basis, etc.).

In some cases, the training data obtainer 222 analyzes or identifies particular training data for use in training models. For example, recipient profile data may be obtained and analyzed to identify recipient profiles with known time zones for use in training models. Such recipient profiles with known time zones can then be used with electronic message data to extract features for use in training models. For example, specific data may be extracted or identified, such as recipient identifiers, known time zones, message delivery data, and message response data. The training data obtainer 222 may further split the training data into a first portion for training the models and a second portion for evaluating the models. In this regard, the first portion of training data can be used to train the models. Upon training the models, the second portion of training data can be used to analyze or evaluate the effectiveness or accuracy of the models. For example, the second portion of training data (which may also be referred to as an evaluation dataset) can be used as an input into the trained models. The scores output from the trained model(s) can be used to identify errors measured by metrics, such as root-mean-square error (RMSE), mean absolute error (MAE), or the like, as described in more detail below.

A collaborative-based model trainer 224 is generally configured to train a collaborative-based model. A collaborative-based model generally refers to a model based on collaborative population information (e.g., a set of recipients). In particular, the collaborative-based model is trained in association with known time zones for recipients of a batch electronic message delivery. For the collaborative-based model, an assumption is that a message delivery (e.g., a batch of messages sent to a group of recipients) is likely to target a group of recipients in a vicinity of a particular time zone or geographically nearby and, as such, unknown time zones for recipients can be inferred from known time zones associated with message delivery. For example, assume an email is designed for a newsletter in a specific language or for a particular event. In such a case, it is likely that the email is delivered to recipients who speak in the specific language or live in the area where the event takes place. To encode such an inference into the time-zone estimation model, the collaborative-based model is trained in accordance with the assumption that an electronic message batch delivery with high distribution density on one known time zone facilitates identification of the localization of recipients with unknown time zones.

At a high-level, the collaborative-based model trainer 224 utilizes message delivery data and recipient profile data associated with known time zones. In this regard, data associated with known time zones for recipients is used to train the collaborative-based model such that the model parameters for use in predicting time zones are identified. Various machine learning techniques may be used to train a collaborative-based model.

In one embodiment, to train the collaborative-based model, a feature vector(s) is generated for recipients with known time zones. Feature vectors that may be generated in association with a user may include a message feature vector and/or a delivery feature vector. A message feature vector generally refers to a feature vector that includes indications of proportions, percentages, or counts of messages sent to recipients in various time zones. In one implementation, a message feature vector is generated for a recipient. The message feature vector for a recipient m includes an indication of a proportion of messages, represented by g, sent to recipients in time zone t. In one implementation, the proportion of messages, g, reflects the actual proportion of messages sent to recipients in a particular time zone when that time zone is the most frequently occurring time zone for a particular delivery of a batch of messages. Otherwise, the value of the proportion of messages, g, is reflected as a zero value. Stated differently, when t is the most frequent time zone in a delivery, the value of g is the proportion of messages sent to recipients in time zone t. For other time zones, g is suppressed to zero.

In some cases, the message feature vector for a recipient m corresponds with multiple deliveries of messages. For example, a particular recipient m may be a recipient of an electronic message in a first batch of delivered emails and a recipient of an electronic message of a second batch of delivered emails. In such a case, the proportion of messages sent to recipients in each time zone may be aggregated (e.g., averaged) for each batch delivery associated with the particular recipient. Accordingly, the message feature vector may reflect or represent an aggregate of message proportions for each time zone. As one example, for each recipient m, a message feature vector is generated that includes every time zone t as h(t,m), defined as:

$$h(t, m) = \sum_{d_i} g(t, d_j)$$

In such a case, h(t,m) represents the mean of $g(t,d_j)$, where $d_j$ is a message delivery to the recipient m. As described above, for each delivery $d_i$, $g(t,d_i)$ is determined for every time zone t. When t is the most frequent time zone in a delivery (as "targeting" time zone), the value of $g(t,d_i)$ is the proportion of messages sent to recipients in time zone t. For other time zones, $g(t,d_i)$ is suppressed to 0.

By way of example only, assume a recipient m is included as a recipient of a first electronic message delivery and a second electronic message delivery. To generate a message feature vector for the recipient, an indication of proportion of messages sent to recipients in various time zones t are determined. In this example, assume a first time zone, $t_1$, for the first message delivery has a proportion of messages sent to recipients in the first time zone of 0.5. Further assume that a first time zone for the second message delivery has a proportion of messages sent to recipients in the first time zone as 0.7. In such a case, the indication of proportion of messages, h (t,m) for the recipient m at time zone $t_1$ is the average equaling 0.6. As such, 0.6 is the proportion h reflected in association with time zone $t_1$ in the message feature vector. A similar determination is made for each time zone.

A delivery feature vector generally refers to a feature vector that includes percentages of deliveries for various time zones. In this regard, a delivery feature vector can be generated for a particular user based on percentages of deliveries to the user in each time zone. By way of example only, assume a user has received five messages in total. Further assume that one message occurred during time zone $t_1$ and four messages occurred during time zone $t_2$. In such a case, the percentage of deliveries targeting time zone $t_1$ for the user is 20%, and the percentage of deliveries targeting time one $t_2$ for the user is 80%.

The collaborative-based model trainer 224 can use the feature vector(s) to train the collaborative-based model. In one embodiment, the collaborative-based model trainer 224 trains a linear model to optimally combine the message feature vector and the delivery feature vector to determine the most likely time zone. In this way, the message feature vector associated with recipient m and the delivery feature vector associated with recipient m are used to train the collaborative-based model to calculate a corresponding most likely time zone. A linear model is only one example, and other implementations may additionally or alternatively be used, such as, for instance, support vector machines (SVM), gradient boosting decision trees, neural network algorithms (e.g., deep neural networks), time-series based models, reinforcement learning models (e.g., Q-learning), etc.

During training, the collaborative-based model can output a set of time-zone scores (also referred to herein as collaborative time-zone scores). A time-zone score generally refers to a probability or likelihood of a corresponding time zone for a recipient. Output may include an indication of one or more time zones and corresponding likelihood or probability of the time zone for the recipient. For example, a time-zone score may include time zone 1 with a corresponding 0.2 likelihood, time zone 2 with a corresponding 0.7 likelihood, time zone 3 with a corresponding 0.0 likelihood, and the like. In some cases, output may include each time zone and corresponding time-zone score. In other cases, output may include a portion of candidate time-zones and corresponding time-zone scores. For example, model output may include only time-zone scores exceeding a threshold likelihood, a predetermined number n of time-zone scores having the highest likelihoods, only the time-zone score having the greatest likelihood, etc.

To train model parameters of the collaborative-based model, a loss function may be used. Stated differently, the collaborative-based model can be trained by evaluating loss to determine any errors or discrepancies. Errors can include inaccuracies, flaws, variations, and/or divergences between the training output and the desired output, often referred to as the ground-truth or output if the model or network was perfectly trained. This desired output may be reflected as the known time zone and used for comparison with the training output time-zone scores. In some embodiments, updating or training the model involves feeding errors back through the model so the algorithm can adjust parameters in order to reduce the value of the error.

Any type of loss function may be used in association with the collaborative-based model to train the model. In one embodiment, a mean absolute error (MAE) loss function is used. MAE is a loss function that can be used for regression models. Generally, MAE is the sum of absolute differences between a target and a predicted variable(s). As such, MAE measures an average magnitude of errors in a set of predictions, without considering the directions of the errors. MAE can be defined as follows:

$$\frac{1}{M}\sum_{m=1}^{M}\min(\Delta^m, |24-\Delta^m|)$$

In another embodiment, a root-mean-square error (RMSE) loss function is used. Generally, RMSE evaluates how far out predictions are from the actual data. RMSE measures the square root of differences of a true dependent variable and predicted dependent variables. RMSE can be defined as follows:

$$\sqrt{\frac{1}{M}\sum_{m=1}^{M}[\min(\Delta^m, |24-\Delta^m|)]^2}$$

For both MAE and RMSE, M represents the number of unique recipients in the data set. $\Delta^m$ represents [arg max$_{\{t:0\leq\}}$ $s_t^m - y^m$] denotes the absolute difference of the estimated time zone arg max$_{\{t:0\leq\}}$ $s_t^m$ with the true time zone $y^m$ for the $m^{th}$ recipient. $s_t^m$ is the score from the model for the $m^{th}$ recipient at $t^{th}$ time zone. As time zones are circular (i.e., the difference between 0 and 23 is 1 (UTC and UTC−1:00), smaller than that of UTC and UTC+5:00), min($\Delta^m$[24−$\Delta^m$]) is measured for each recipient rather than the conventional absolute difference $\Delta^m$. As can be appreciated, in embodiments, to evaluate the difference of time zones, the time zones can be converted to integers (e.g., [0, 1, 2, . . . 23] with the unit of the difference being an hour. Additional or alternative loss functions may include, for instance, a multi-class cross entropy loss function, a Kullback Leibler Divergence loss function, and/or other loss functions for regression and classification problems.

As previously described, the training data may be split or separated into a first portion to train the model and a second portion to evaluate the model. In such a case, the collaborative-based model trainer 224 can use the second portion of data to evaluate or analyze the trained model. To evaluate the performance of the trained model, the evaluation dataset can be used as an input into the trained collaboration-based model and scored. Errors can be measured by various metrics, such as MAE or RMSE, an adjusted R-square, an accuracy, a recall, a confusion matrix, a precision, a F-1 score, a log loss, a Gini coefficient, among other metrics.

An individual-based model trainer 226 is generally configured to train an individual-based model. An individual-based model generally refers to a model based on, at least in part, individual recipient activities (e.g., recipient responses to electronic communications). The individual-based model trainer 226 is generally based on the assumption that electronic message recipients typically respond to electronic messages, or otherwise interact with electronic messages, in their awake hours. Accordingly, a recipient's message interactions can imply or indicate his or her local time zone. As such, the individual-based model is trained based on individual activities for estimating time zones.

At a high-level, the individual-based model trainer 226 utilizes message delivery data, message response data, and recipient profile data associated with known time zones. The individual-based model is trained in association with known time zones for recipients of a batch electronic message delivery. In this regard, data associated with known time zones for recipients is used to train the individual-based model such that the model parameters for use in predicting time zones are identified.

In one embodiment, to train the individual-based model, a feature vector(s) is generated for recipients with known time zones. Feature vectors may include, for example, unresponsive feature vector, responsive feature vector, and response time feature vector. An unresponsive feature vector refers to a feature vector that represents hourly counts, such as normalized hourly counts in 24 dimensions, for the delivery times of messages without response. A responsive feature vector refers to a feature vector that represents hourly counts, such as normalized hourly counts in 24 dimensions, for the delivery times of messages with responses. The response time feature vector refers to a feature vector that represents hourly counts, such as normalized hourly counts in 24 dimensions, for the response times of messages with responses. Responses may be configured to be any type of response, such as, but not limited to, opening a message, clicking a message, opting out, etc.

In embodiments, the feature vectors are specific to recipient. In this regard, the corresponding count in a feature vector reflects data associated with a particular recipient during an hour time period. For instance, all electronic communications associated with a particular recipient can be analyzed to identify counts for each hour of a 24-hour time duration. By way of example only, assume a digital marketing campaign system delivers 10 emails to a recipient over a month. The message delivery data and message response data can be analyzed for each of those 10 emails. For instance, a count associated with each hour (e.g., hour 1, hour 2, hour 3) can be determined in connection with delivery times occurring during each hour without a response, delivery times occurring during each hour with a response, and recipient responses occurring during each hour. Feature vectors can be generated in this manner for various recipients, including each recipient with known time zones. Such feature vectors can be used as input to the individual-based model to train the model.

Figure 3:
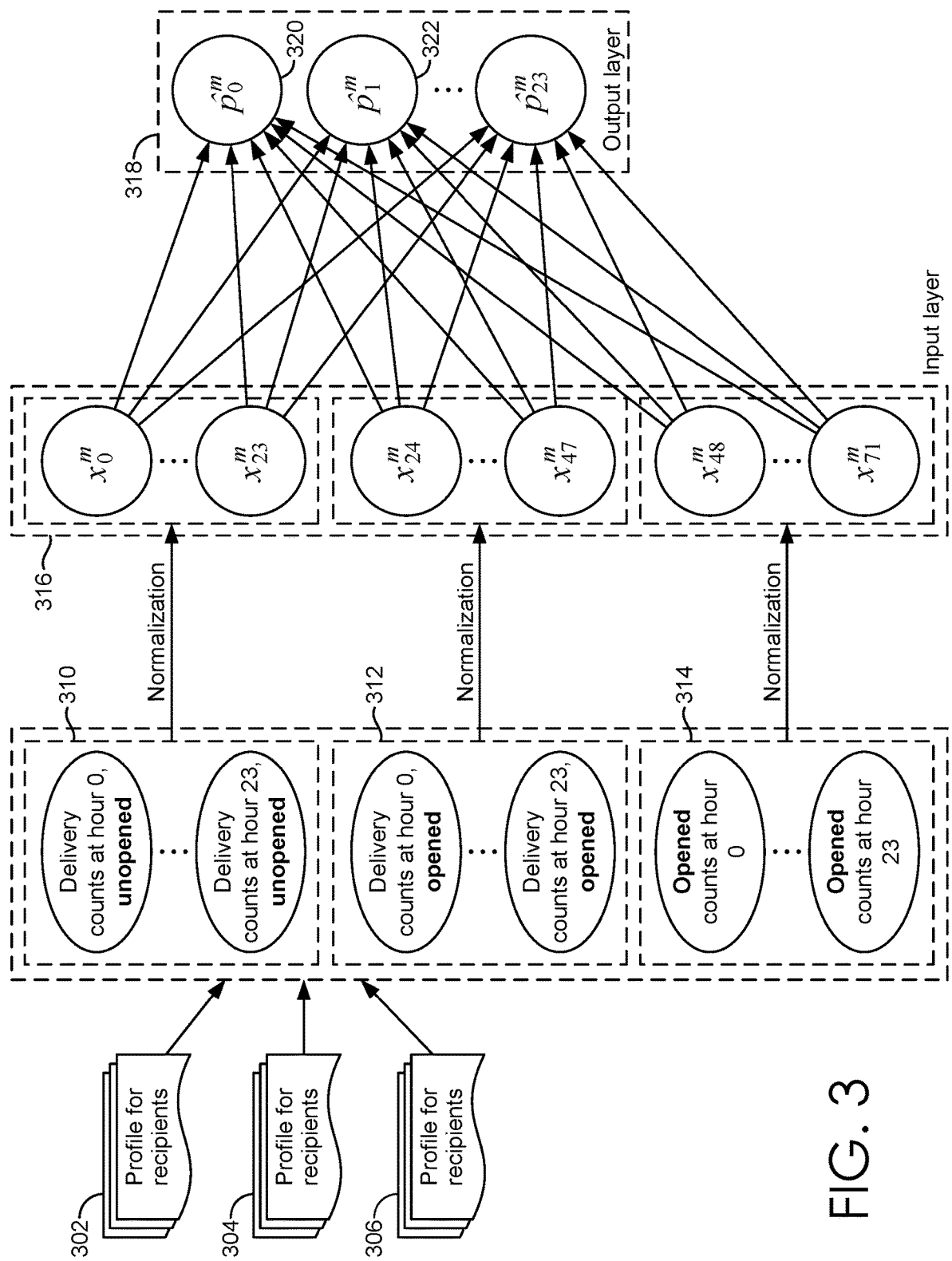
FIG. 3 depicts aspects of an illustrative structure of an individual-based model, in accordance with various embodiments of the present disclosure.

Various machine learning techniques may be used to train an individual-based model. In one embodiment, the input for training is a 72-dimension embedding for a specific recipient that includes a concatenation of the responsive feature vector, the unresponsive feature vector, and the response time feature vector. The feature vectors can be used as an input into a neural network framework. An example structure of the neural network model based on individual activities is illustrated in FIG. 3. As shown in FIG. 3, the recipient profiles 302, message delivery information 304, and message response information 306 are provided. Based on the electronic message data and profile data, feature vectors 310, 312, and 314 are generated. Feature vector 310 is an unresponsive feature vector, feature vector 312 is a responsive feature vector, and feature vector 314 is a response time feature vector. As shown in FIG. 3, the feature vectors are normalized and provided as an input to the neural network framework as the input layer 316. The neural network framework can include a fully connected dense layer. The neural network can output probabilities or scores associated with the time zones via output layer 318. As shown in the output layer 318, for the recipient m, a first probability $p_0$ 320 is provided for a first time zone $t_0$, a second probability $p_1$ 322 is provided for a second time zone $t_1$, and so on.

During training, the individual-based model can output a time-zone score(s) (also referred to herein as individual time-zone scores). A time-zone score generally refers to a probability or likelihood of a corresponding time zone for a recipient. Output may include an indication of one or more time zones and corresponding likelihood or probability of the time zone for the recipient. For example, a time-zone score may include time zone 1 with a corresponding 0.2 likelihood, time zone 2 with a corresponding 0.7 likelihood, time zone 3 with a corresponding 0.0 likelihood, and the like. In some cases, output may include each time zone and corresponding time-zone score. In other cases, output may include a portion of candidate time-zones and corresponding time-zone scores. For example, model output may include only time-zone scores exceeding a threshold likelihood, a predetermined number n of time-zone scores having the highest likelihoods, only the time-zone score having the greatest likelihood, etc.

To train model parameters of the individual-based model, a loss function may be used. Stated differently, the individual-based model can be trained by minimizing loss to determine any errors or discrepancies. Errors can include inaccuracies, flaws, variations, and/or divergences between the training output and the desired output, often referred to as the ground-truth or output if the model or network was perfectly trained. This desired output may be reflected as the known time zone and used for comparison with the training output. In some embodiments, updating or training the model involves feeding errors back through the model so the algorithm can adjust parameters in order to reduce the value of the error.

Any type of loss function may be used in association with the individual-based model to train the model. In one embodiment, a cross-entropy loss function is used. In particular, for the individual-based model, the cross-entropy loss is minimized. Loss can be defined as follows:

$$\sum_m \sum_t p_t^m \log(\hat{p}_t^m).$$

In this equation, $$p_t^m \text{ and } \hat{p}_t^m$$

are the real and predicted probabilities for the $m^{th}$ recipient at the $t^{th}$ hour respectively. A one-hot distribution or locally smoothed distribution may be used to represent the distribution for a known time zone. For example, a locally smoothed distribution may be represented as [0.2, 0.6, 0.2, 0, . . . , 0] for the true time zone in time zone 1 (index start from 0), while a one-hot distribution is represented as [0, 1, 0, 0, . . . , 0]. Additional or alternative loss functions may be used, such as, for instance, a root-mean-square error loss function, a mean absolute error loss function, a mean squared logarithmic error loss function, or the like.

As previously described, the training data may be split or separated into a first portion to train the model and a second portion to evaluate the model. In such a case, the individual-based model trainer 226 can use the second portion of data to evaluate or analyze the trained model. To evaluate the performance of the trained model, the evaluation dataset can be used as an input into the trained individual-based model and scored. Errors can be measured by various metrics, such as MAE or RMSE, an adjusted R-square, an accuracy, a recall, a confusion matrix, a precision a F-1 score, a log loss, a Gini coefficient, among other metrics.

A normalizer 228 is generally configured to normalize output from the individual-based model and/or the collaboration-based model. In some embodiments, the output scores can be normalized by centering and scaling the data. A normalizer 228 is described herein to normalize the data, but need not be implemented.

The prediction model trainer 230 is generally configured to train a prediction model. The output scores (normalized output scores) of the individual-based model and the collaboration-based model can be used to train the prediction model. In this regard, the output of the two models (e.g., probabilities or scores for 24 time zones) can be combined together and used as an input into the prediction model to train the model. In one embodiment, the prediction model is a logistic regression model. In other embodiments, the prediction model may be another machine learning model, such as neural networks, SVM, Naïve, or the like.

Turning to the estimating engine 240, the estimating engine is used to generate time zone estimates or predictions for recipients with unknown time zones. In this regard, in cases that a recipient is not associated with a known time zone, the estimating engine 240 can be used to identify a time zone for the recipient. In execution, the estimating engine 240, trained for example in accordance with the present disclosure, can be used to estimate or predict time zones for recipients. The method of generating time zone predictions employed by estimating engine 240 can be similar to the process described for training the time-zone estimation model. However, in execution, input data is typically associated with a recipient having an unknown time zone such that a time zone can be estimated for the recipient. As such, input data associated with recipients of unknown time zones can be obtained and analyzed. For example, such data can be analyzed to generate appropriate feature vectors, which can then be used as an input to the appropriate model for predicting time zones.

By way of example, the estimating engine 240 can use the trained time-zone estimation model to generate a time zone estimation. The trained time-zone estimation model can be comprised of one or more models trained to generate designated output. For instance, a time-zone estimation model can include a collaboration-based model that generates time-zone scores based on collaborative information (e.g., electronic messages sent or delivered as a batch to a group of recipients) and an individual-based model that generates time-zone scores based on individual information (e.g., recipient responses to received electronic messages). The time-zone scores can be normalized and used as input to a trained prediction model to predict a final set of time-zone scores. Accordingly, the hierarchical implementation used to train the time-zone estimation model can also be used to predict a time zone otherwise unknown for recipients.

As can be appreciated, the trained time-zone estimation model may output a set of time-zone scores and corresponding time zones. As such, the estimating engine 240 may analyze the output and select or designate the time zone with the highest score as the time zone for the recipient. In other cases, the estimating engine 240 may designate a time zone as the time zone for the recipient if the time zone exceeds a threshold value. The estimating engine 240 can identify a time zone for a recipient in any number of ways, only some of which are provided as examples herein.

The estimating engine 240 may initiate storage of the selected time zone or each of the time-zone scores and corresponding time zone. Such an identified time zone, or set of time-zone scores, may alternatively or additionally be communicated to another component for utilization or further analysis. For example, an identified time zone for a recipient may be added to a recipient profile or provided to a digital marketing campaign system for use in scheduling electronic communication deliveries.

Figure 4:
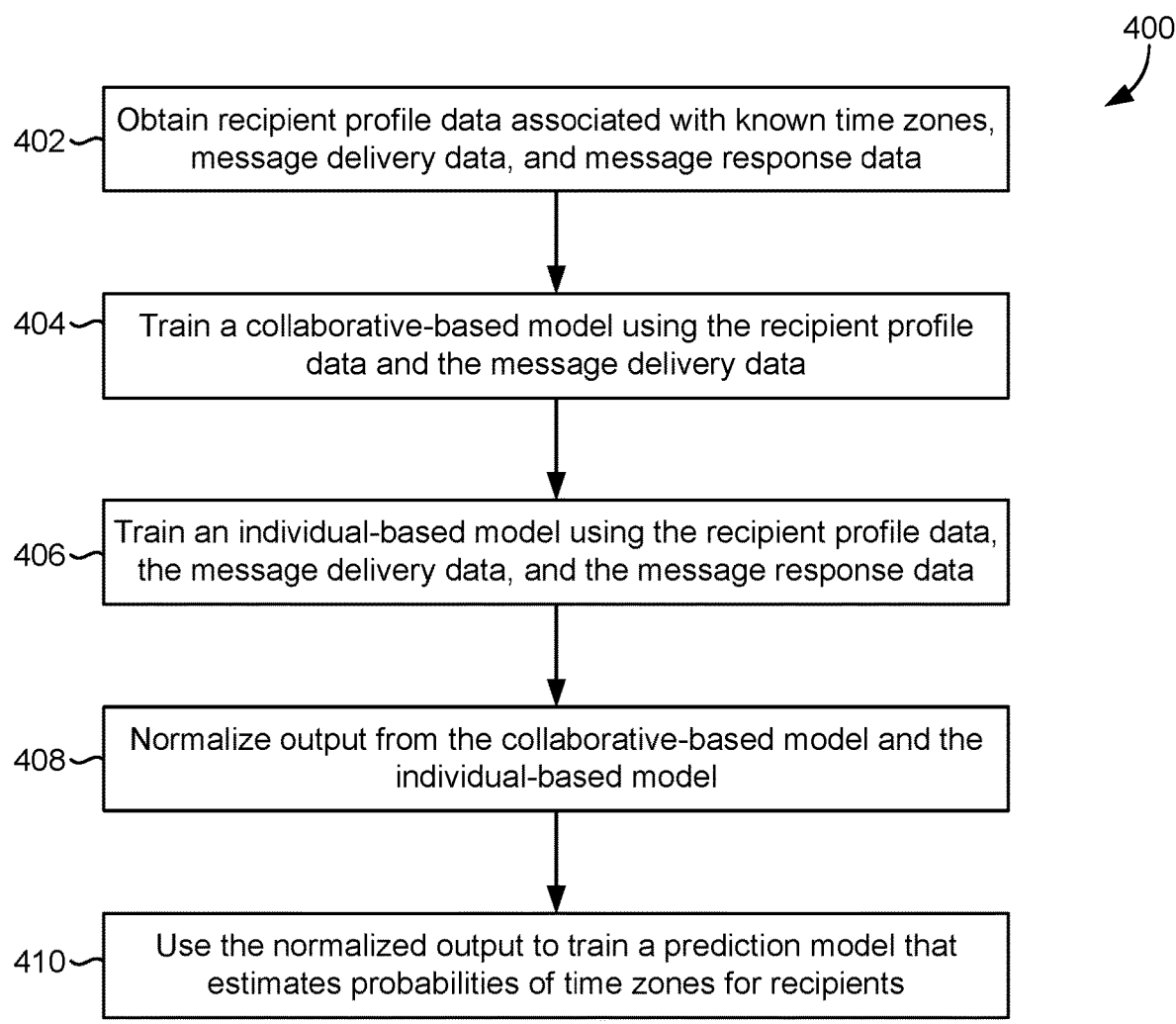
FIG. 4 provides an example method for training a time-zone estimation model, in accordance with embodiments of the present disclosure.

Turning now to FIGS. 4-7, FIGS. 4-7 provide illustrative flows of methods for facilitation time zone estimation. With reference initially to FIG. 4, a process flow is provided showing an embodiment of method 400 for training a time-zone estimation model, in accordance with embodiments of the present technology.

At block 402, recipient profile data associated with known time zones, message delivery data associated with electronic messages delivered in batches to groups of recipients, and message response data associated with a responses to received electronic messages are obtained.

At block 404, a collaborative-based model is trained using the recipient profile data and the message delivery data. At block 406, an individual-based model is trained using the recipient profile data, the message delivery data, and the message response data. Output from the collaborative-based model and the individual-based model is normalized, as indicated at block 408. Such normalized output is used to train a prediction model that estimates probabilities of time zones for recipients, as indicated at block 410.

Figure 5:
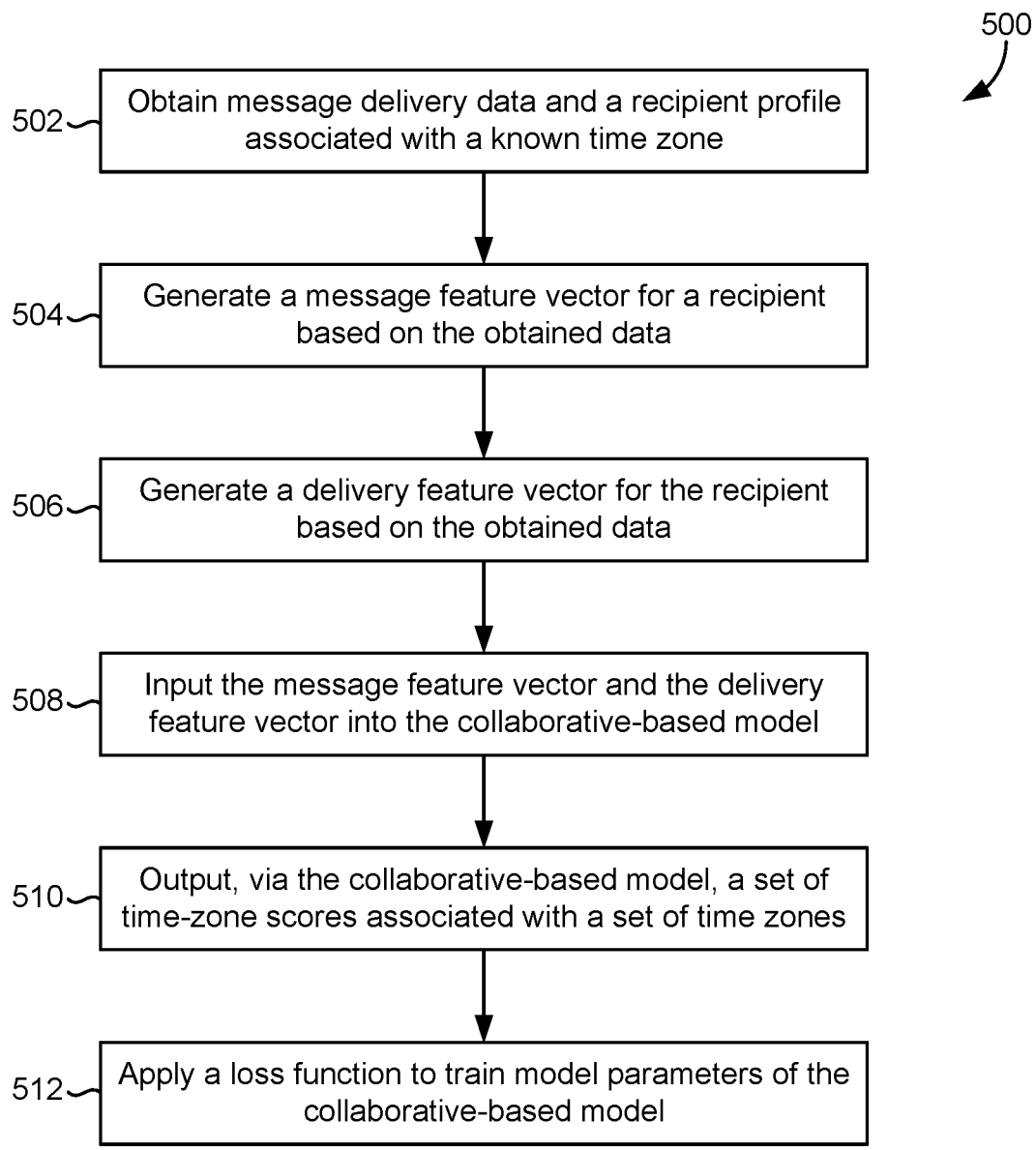
FIG. 5 illustrates an example method for training a collaborative-based model, in accordance with embodiments of the present technology.

With reference to FIG. 5, FIG. 5 provides an example implementation for training a collaborative-based model. Initially, at block 502, message delivery data and a recipient profile associated with a known time zone are obtained. At block 504, a message feature vector is generated for a recipient based on the obtained data. A message feature vector for a recipient can include indications of proportions of messages sent to recipients in a set of time zones. At block 506, a delivery feature vector is generated for a recipient based on the obtained data. A delivery feature vector for a recipient can include percentages of deliveries targeting the set of time zones. At block 508, the message feature vector and the delivery feature vector are used as an input into the collaborative-based model. The collaborative-based model outputs a set of time-zone scores associated with the set of time zones, as indicated at block 510. To train model parameters of the collaborative-based model, as indicated at block 512, a loss function is applied. Such a loss function may be a MAE loss function or a RMSE loss function.

Figure 6:
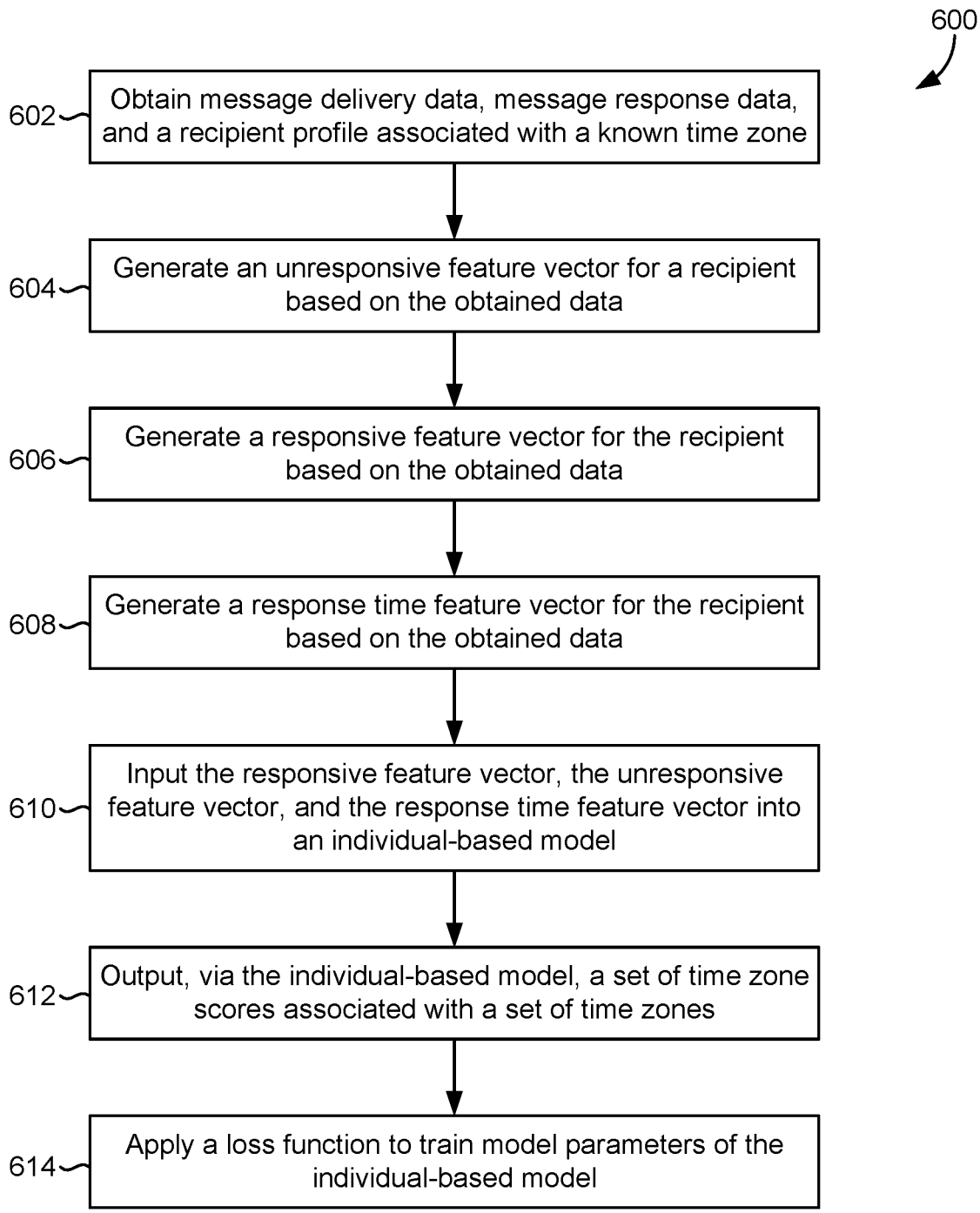
FIG. 6 illustrates an example method for training an individual-based model, in accordance with embodiments of the present technology.

With reference to FIG. 6, FIG. 6 provides an example implementation for training an individual-based model. Initially, at block 602, message delivery data, message response data, and a recipient profile associated with a known time zone are obtained. At block 604, an unresponsive feature vector is generated for a recipient based on the obtained data. An unresponsive feature vector may include hourly counts for delivery times of messages without responses. At block 606, a responsive feature vector is generated for a recipient based on the obtained data. A responsive feature vector may include hourly counts for delivery times of messages with responses. At block 608, a response time feature vector is generated for a recipient based on the obtained data. A response time feature vector may include hourly counts for the response times of messages with responses. Subsequently, at block 610, the responsive feature vector, the unresponsive feature vector, and the response time feature vector are used as an input into the individual-based model. The individual-based model outputs a set of time-zone scores associated with the set of time zones, as indicated at block 612. To train model parameters of the individual-based model, as indicated at block 614, a loss function is applied. Such a loss function may be a cross-entropy loss function.

Figure 7:
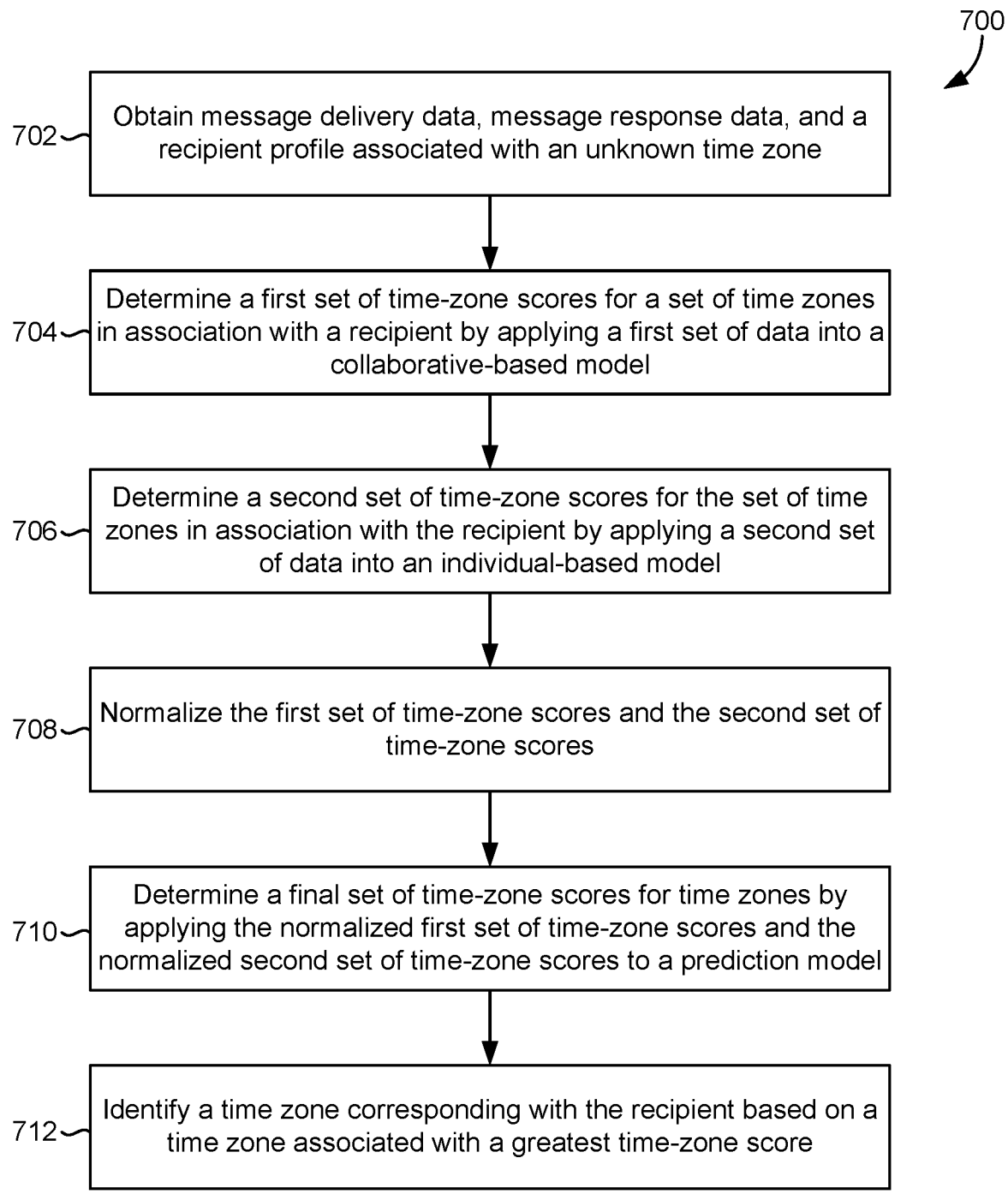
FIG. 7 illustrates an example method for performing time zone estimation using a time-zone estimation model, in accordance with embodiments of the present technology.

Turning now to FIG. 7, FIG. 7 provides an example implementation for performing time zone estimation using a time-zone estimation model. At block 702, message delivery data, message response data, and a recipient profile associated with an unknown time zone are obtained. Subsequently, at block 704, a first set of time-zone scores are determined for a set of time zones in association with a recipient by applying a first set of data associated with the recipient into a collaborative-based model. The first set of data can include indications of proportions of messages sent to recipients in association with the set of time zones and/or indications of percentages of message deliveries associated with the set of time zones.

At block 706, a second set of time-zone scores are determined for the set of time zones in association with the recipient by applying a second set of data associated with the recipient into an individual-based model. The second set of data may include indications of response times for messages in association with the set of time zones, indications of delivery times of messages without responses in association with the set of time zones, and indications of delivery times of messages with responses in association with the set of time zones.

At block 708, the first set of time-zone scores and the second set of time-zone scores are normalized. Thereafter, at block 710, a final set of time-zone scores is determined for the time zones of the set of time zones in association with the recipient by applying the normalized first set of time-zone scores and the normalized second set of time-zone scores to a prediction model. The final time-zone scores indicates a probability that the corresponding time zone corresponds with the recipient. At block 712, a time zone associated with a greatest time-zone score is identified as the time zone corresponding with the recipient.

Figure 8:
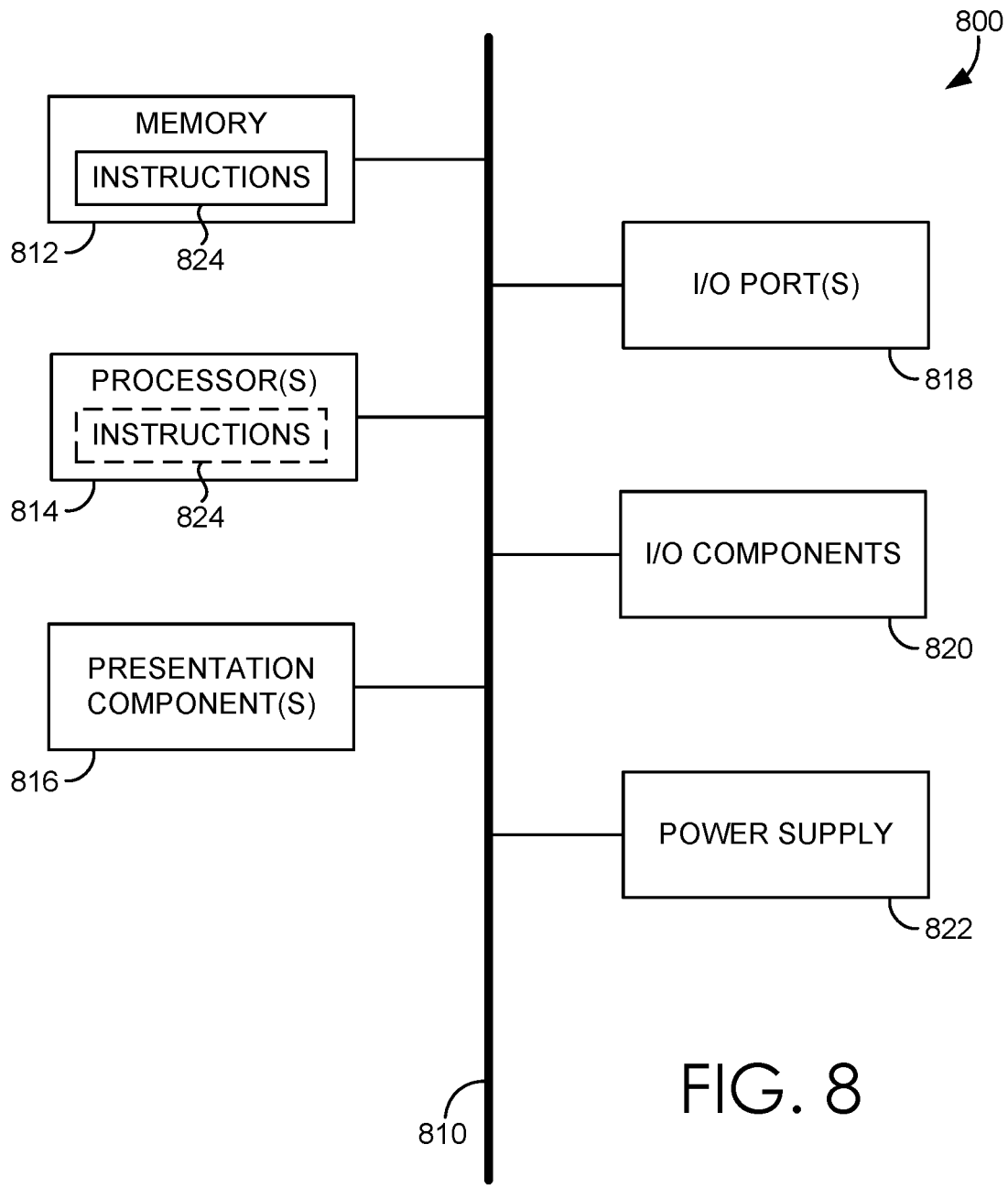
FIG. 8 is a block diagram of an example computing device in which embodiments of the present disclosure may be employed.

Having described embodiments of the present invention, FIG. 8 provides an example of a computing device in which embodiments of the present invention may be employed. Computing device 800 includes bus 810 that directly or indirectly couples the following devices: memory 812, one or more processors 814, one or more presentation components 816, input/output (I/O) ports 818, input/output components 820, and illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art and reiterate that the diagram of FIG. 8 is merely illustrative of an exemplary computing device that can be used in connection with one or more embodiments of the present technology. Distinction is not made between such categories as "workstation," "server," "laptop," "handheld device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 812 includes computer storage media in the form of volatile and/or nonvolatile memory. As depicted, memory 812 includes instructions 824. Instructions 824, when executed by processor(s) 814 are configured to cause the computing device to perform any of the operations described herein, in reference to the above discussed figures, or to implement any program modules described herein. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc. I/O components 820 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 800. Computing device 800 may be equipped with depth cameras, such as stereoscopic camera systems, infrared camera systems, RGB camera systems, and combinations of these, for gesture detection and recognition. Additionally, computing device 800 may be equipped with accelerometers or gyroscopes that enable detection of motion. The output of the accelerometers or gyroscopes may be provided to the display of computing device 800 to render immersive augmented reality or virtual reality.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A computer-implemented method for predicting time zones, the method comprising:
   obtaining, via a time zone estimation system, electronic message data associated with a message recipient of electronic communications, the electronic message data including message delivery data associated with a first electronic message delivered as a set of electronic messages to a group of recipients including the message recipient and message response data associated with a response, by the message recipient, to a second electronic message that was received by the message recipient;
   determining, using a machine learning model of the time zone estimation system and based on the message delivery data and the message response data, a time-zone score for a time zone, the time-zone score indicating a probability the time zone corresponds with the message recipient based at least on a proportion of messages of the set of electronic messages sent to recipients of the group of recipients associated with the time zone;
   based on the time-zone score, identifying, via the time zone estimation system, the time zone as corresponding with the message recipient;
   using the time zone identified for the message recipient to schedule at least one subsequent electronic communication delivery; and
   initiating one or more electronic communication deliveries to the message recipient, via a network, in accordance with the schedule.

2. The computer-implemented method of claim 1, wherein the machine learning model comprises a hierarchical set of models including a collaborative-based model that uses the message delivery data associated with the first electronic message delivered as the set of electronic messages to the group of recipients, including the message recipient, to predict a first time-zone score for the time zone, an individual-based model that uses the message delivery data and the message response data to predict a second time-zone score for the time zone, and a prediction model that uses first time-zone score and the second time-zone score to predict the time-zone score for the time zone.

3. The computer-implemented method of claim 1, further comprising:
generating a first set of feature vectors using the message delivery data;
inputting the first set of feature vectors into a collaborative-based model of the machine learning model to predict a first time-zone score for the time zone;
generating a second set of feature vectors using the message delivery data and the message response data;
inputting the second set of feature vectors into an individual-based model of the machine learning model; and
using output from the collaborative-based model and output from the individual-based model to determine the time-zone score for the time zone.

4. The computer-implemented method of claim 3, wherein the first set of feature vectors comprises a message feature vector indicating the proportion of messages of the set of electronic messages sent to recipients of the group of recipients in association with a set of time zones and a delivery feature vector indicating percentages of message deliveries to the message recipient in association with the set of time zones.

5. The computer-implemented method of claim 4, wherein the collaborative-based model is trained using a mean absolute error loss function, a root-mean-square error loss function, multi-class cross entropy, or a Kullback Leibler Divergence loss.

6. The computer-implemented method of claim 3, wherein the second set of feature vectors comprises an unresponsive feature vector indicating a count of message deliveries without responses, a responsive feature vector indicating a count of message deliveries with responses, and a response time feature vector indicating a count of response times associated with message deliveries.

7. The computer-implemented method of claim 6, wherein the individual-based model is trained using a cross-entropy loss function, a root-mean-square error loss function, a mean absolute error loss function, or a mean squared logarithmic error loss function.

8. The computer-implemented method of claim 1 further comprising providing the time zone for inclusion in a profile associated with the message recipient.

9. The computer-implemented method of claim 1, wherein the machine learning model comprises a collaborative-based model that uses the message delivery data to predict a first time-zone score for the time zone and/or an individual-based model that uses the message delivery data and the message response data to predict a second time-zone score for the time zone.

10. One or more non-transitory computer-readable media having a plurality of executable instructions embodied thereon, which, when executed by one or more processors, cause the one or more processors to perform operations comprising:
determining, using a collaborative-based machine learning model, a first set of time-zone scores for a set of time zones in association with a recipient of electronic communications by processing a first set of data associated with the recipient, the first set of data including indications of one or more aggregate proportions of messages sent to groups of recipients associated with each time zone of the set of time zones, wherein an aggregate proportion associated with a particular time zone comprises an aggregate of a first proportion of messages sent to a first group of recipients in the particular time zone in association with a first message delivery and a second proportion of messages sent to a second group of recipients in the particular time zone in association with a second message delivery;
determining, using an individual-based machine learning model, a second set of time-zone scores for the set of time zones in association with the recipient by processing a second set of data associated with the recipient into, the second set of data including indications of response times for messages in association with the set of time zones;
normalizing the first set of time-zone scores and the second set of time-zone scores; and
determining, using a prediction machine learning model, a final set of time-zone scores for the time zones for the set of time zones in association with the recipient by processing the normalized first set of time-zone scores and the normalized second set of time-zone scores, each of the final time-zone scores indicating a probability that the corresponding time zone corresponds with the recipient
based on the final set of time-zone scores for the time zones, identifying a time zone for the recipient;
using the time zone identified for the recipient to schedule at least one subsequent electronic communication delivery; and
initiating one or more electronic communication deliveries to the recipient, via a network, in accordance with the schedule.

11. The media of claim 10, wherein the first set of data further includes indications of percentages of message deliveries associated with the set of time zones.

12. The media of claim 11, wherein the collaborative-based machine learning model comprises a linear model, a neural network, a gradient boosting decision tree, or a reinforcement learning model trained to optimize the first set of data using a mean absolute error loss function, a root-mean-square error loss function, or a mean squared logarithmic error loss function.

13. The media of claim 10, wherein the second set of data further includes indications of delivery times of messages without responses in association with the set of time zones and indications of delivery times of messages with responses in association with the set of time zones.

14. The media of claim 13, wherein the individual-based machine learning model is trained using a cross-entropy loss function, a mean absolute error loss function, a root-mean-square error loss function, or a mean squared logarithmic error loss function.

15. The media of claim 14, wherein performance of the trained individual-based machine learning model is evaluated using a mean absolute error loss function, a root-mean-square error loss function, an adjusted R-square, an accuracy, a recall, a confusion matrix, a precision, a F-1 score, a log loss, or a Gini coefficient.

16. The media of claim 10, wherein the recipient previously had an unknown time zone.

17. A computing system comprising:
one or more processors; and
one or more memory components, coupled with the one or more processors, having instructions stored thereon which when executed by the one or more processors, cause the computing system to:
- obtain electronic message data associated with a message recipient of electronic communications, the electronic message data including message delivery data associated with a first electronic message delivered as a set of electronic messages to a group of recipients including the message recipient and message response data associated with a response, by the message recipient, to a second electronic message that was received by the message recipient;
- determine, using a machine learning model and based on the message delivery data and the message response data, a time-zone score for a time zone, the time-zone score indicating a probability the time zone corresponds with the message recipient based at least on a proportion of messages of the set of electronic messages sent to recipients of the group of recipients associated with the time zone;
- based on the time-zone score, identify the time zone as corresponding with the message recipient;
- use the time zone identified for the message recipient to schedule at least one subsequent electronic communication delivery; and
- initiate one or more electronic communication deliveries to the message recipient, via a network, in accordance with the schedule.

18. The computing system of claim 17, wherein the machine learning model comprises a hierarchical set of models including a collaborative-based model that uses the message delivery data associated with the first electronic message delivered as the set of electronic messages to the group of recipients, including the message recipient, to predict a first time-zone score for the time zone, an individual-based model that uses the message delivery data and the message response data to predict a second time-zone score for the time zone, and a prediction model that uses first time-zone score and the second time-zone score to predict the time-zone score for the time zone.

19. The computing system of claim 17, wherein the machine learning model comprises a collaborative-based model that uses the message delivery data to predict a first time-zone score for the time zone and/or an individual-based model that uses the message delivery data and the message response data to predict a second time-zone score for the time zone.

20. The computing system of claim 17 further causing the computing system to provide the time zone for inclusion in a profile associated with the message recipient.

* * * * *